United States Patent

Hofer et al.

[11] Patent Number: 5,222,768
[45] Date of Patent: Jun. 29, 1993

[54] FLUID LINE NUT LOCKING DEVICE

[75] Inventors: Willard L. Hofer; Ernest E. Marks; Nathan P. Lee, all of Boise, Id.

[73] Assignee: Micron Technology, Inc., Boise, Id.

[21] Appl. No.: 923,281

[22] Filed: Jul. 31, 1992

[51] Int. Cl.⁵ .......................................... F16L 35/00
[52] U.S. Cl. .................................... 285/39; 285/92; 285/420; 411/120; 403/11; 403/19
[58] Field of Search ............... 411/119, 120, 121; 285/39, 92, 367, 420; 70/230; 403/11, 19

[56] References Cited

U.S. PATENT DOCUMENTS

| | | | |
|---|---|---|---|
| 1,058,295 | 4/1913 | Faucher . | |
| 1,335,131 | 3/1920 | Schworm . | |
| 1,652,605 | 12/1927 | Burkhalter . | |
| 2,372,889 | 4/1945 | Duggan . | |
| 2,880,637 | 3/1959 | Koenig . | |
| 3,493,026 | 2/1970 | Donofrio et al. | 411/120 |
| 3,877,734 | 4/1975 | Brozek | 285/249 |
| 3,879,070 | 4/1975 | Russ | 285/342 |
| 4,076,281 | 2/1978 | Davis | 285/64 |
| 4,108,474 | 8/1978 | Sigrist | 285/39 X |
| 4,223,799 | 9/1980 | Euster | 220/230 |
| 4,289,295 | 9/1981 | Allread | 251/149.2 |
| 4,313,828 | 2/1982 | Brownlee | 210/198.2 |
| 4,343,498 | 8/1982 | Campanini | 285/174 |
| 4,412,693 | 11/1983 | Campanini | 285/39 |
| 4,488,741 | 12/1984 | Conley | 285/250 |
| 4,519,634 | 5/1985 | Hand | 285/55 |
| 4,613,171 | 9/1986 | Corcoran | 285/197 |
| 4,635,972 | 1/1987 | Lyall | 285/242 |
| 4,685,708 | 8/1987 | Conner | 285/374 |
| 4,750,762 | 6/1988 | Corzine | 285/45 |
| 4,862,959 | 9/1978 | Kaven | 285/39 X |
| 4,971,289 | 11/1990 | Pietras | 411/120 X |
| 4,973,065 | 11/1990 | Habich | 277/87 |
| 5,139,289 | 8/1992 | Koss | 285/92 |

FOREIGN PATENT DOCUMENTS 8700592 1/1987 World Int. Prop. O. ......... 411/120

Primary Examiner—Eric K. Nicholson
Assistant Examiner—Heather Chun
Attorney, Agent, or Firm—Wayne E. Duffy

[57] ABSTRACT

A detachable locking device is described which consists of a pair of standard box end wrenches with shortened handles having integral ears on the ends of the handles with openings therethrough. The wrenches are first placed behind the respective connecting nuts on the line termination point adapter assemblies which are to be joined. The preliminary connection and seal is then made using conventional methods and the connecting nuts are torqued to near their optimum value. The box end wrenches of the locking device are then positioned on the nuts so that a connecting bolt can be passed through the openings in the ears on the handles, a nut attached thereto and then tightened to hold and secure the connecting nuts together and prevent the nuts from loosening or seal leaking during the operation of the fluid transmission line.

1 Claim, 3 Drawing Sheets

FLUID LINE NUT LOCKING DEVICE

BACKGROUND OF THE INVENTION

1. Field of the Invention

This invention relates to a removable locking device to hold and secure the connection between typical nut type end fittings on two fluid transmission lines being detachably joined together.

2. Prior Art

Fluid transmission lines, such as those carrying reactive gases used in certain semiconductor manufacturing processes, are often vulnerable to leaks or breakage induced by stress from vibration, twisting, temperature change or other environmental conditions. This frequently results in significant downtime, costly repairs and loss of production. Standard, detachable nut type fittings such as, but not limited to those supplied by Cajun and Fox, rely principally upon friction and threaded type connection to achieve and maintain tight, leak proof seals which are generally resistant to significant leakage or breakage. Experience has shown that such connections do fail, under continuous use, from vibration, line twisting and temperature change, often enough to affect significantly the above mentioned industrial operations. Experience has also shown that the failure occurs most frequently at the union of the lines, due to loosening of the detachable, nut type connecting fittings.

Review of the patent literature indicates that there are many lock type devices designed to hold a variety of nut type end fittings together. However most of them are of special, often complicated design, requiring customized components not readily adaptable to commercially available, standard detachable nut type fittings.

One relative simple device is described in U.S. Pat. No. 2,880,637, issued Apr. 7, 1959, to Koenig. This invention consists primarily of a readily attachable nut lock for a nut have a circumferential groove thereon or an available unengaged thread at the upper portion of the connecting bolt, said nut lock comprising a wrench having a nut engaging portion and a portion or spline extending outwardly from the axis of the nut and a special, resilient clamp, such as a spring clip, adapted to be slipped on the wrench after it has been torqued, to hold it against longitudinal displacement relative to the nut and a fixed adjacent structure. This method works for one nut but does not obviously lead to development of the device to be described and distinguished herein.

SUMMARY OF THE INVENTION

This invention provides a simple, detachable locking means to secure a gas tight connection between standard nut type adapter fittings used to detachably join two fluid transmission lines, typically pressurized reactive gases used in the manufacture of semiconductor components. The gas lines, their nut type connecting means and the sealing means used therebetween are well-known, will depend upon the use intended and are not a part of this invention. The removable nut locking means, which is the essential element of this invention, consists primarily of a pair of standard box end wrenches with shortened and modified handles, which have either an annular or slotted hole in the handles to enable them to be adjustably locked together by means of a suitable bolt and nut when each has been placed on an opposing connecting nut of the two opposing gas lines and the sealed connection has been made. The connecting seal is made and connecting nuts are torqued to near their optimum value before the locking box wrench means are placed upon the respective connecting nuts. The box end wrenches are placed upon the respective individual gas lines before the two lines are connected and the nuts are initially torqued to near their optimum value. The wrenches are positioned about the respective nuts, both axially and angularly, in such a manner that the final, rotational adjustment of the nuts will place the shortened and modified handles of the wrenches in close proximity and alignment with each other so that the handles can be locked together by a suitable threaded bolt and attachable nut. Locking the two connecting nuts together in this way counteracts twisted gas lines and loosened connections, which often occur with this type of gas line connection. The tension on the locking bolt which holds the two wrenches together generally tends to hold the wrenches in place upon the respective connecting nuts. However, where the line union is in other than a horizontal position or where severe vibration or temperature changes may occur, the wrenches may be secured to the nuts by means of set screws, not shown, to prevent the nut locking assembly from being dislodged from the connecting nuts.

DESCRIPTION OF THE PREFERRED EMBODIMENTS

The preferred embodiments illustrate typical applications for the fluid line connecting nut locking device as a means for holding and securing the connecting nuts and seal between two pressurized gas lines such as those used to carry reactive gases employed in various semiconductor manufacturing processes. The connecting lines, their adaptive end connecting means and the sealing means between are standard, commercially available, typical means, such as those provided by Cajun and Fox and are not a part of this invention. The nuts on the ends of the gas lines to be detachably joined are usually of similar size and design, of mating or matching configuration and are amenable to control and operation by the type of nut lock described in the two preferred embodiments of this invention. Of course variations and modifications in shape and size will be obvious to those familiar with the art.

Figure 3:
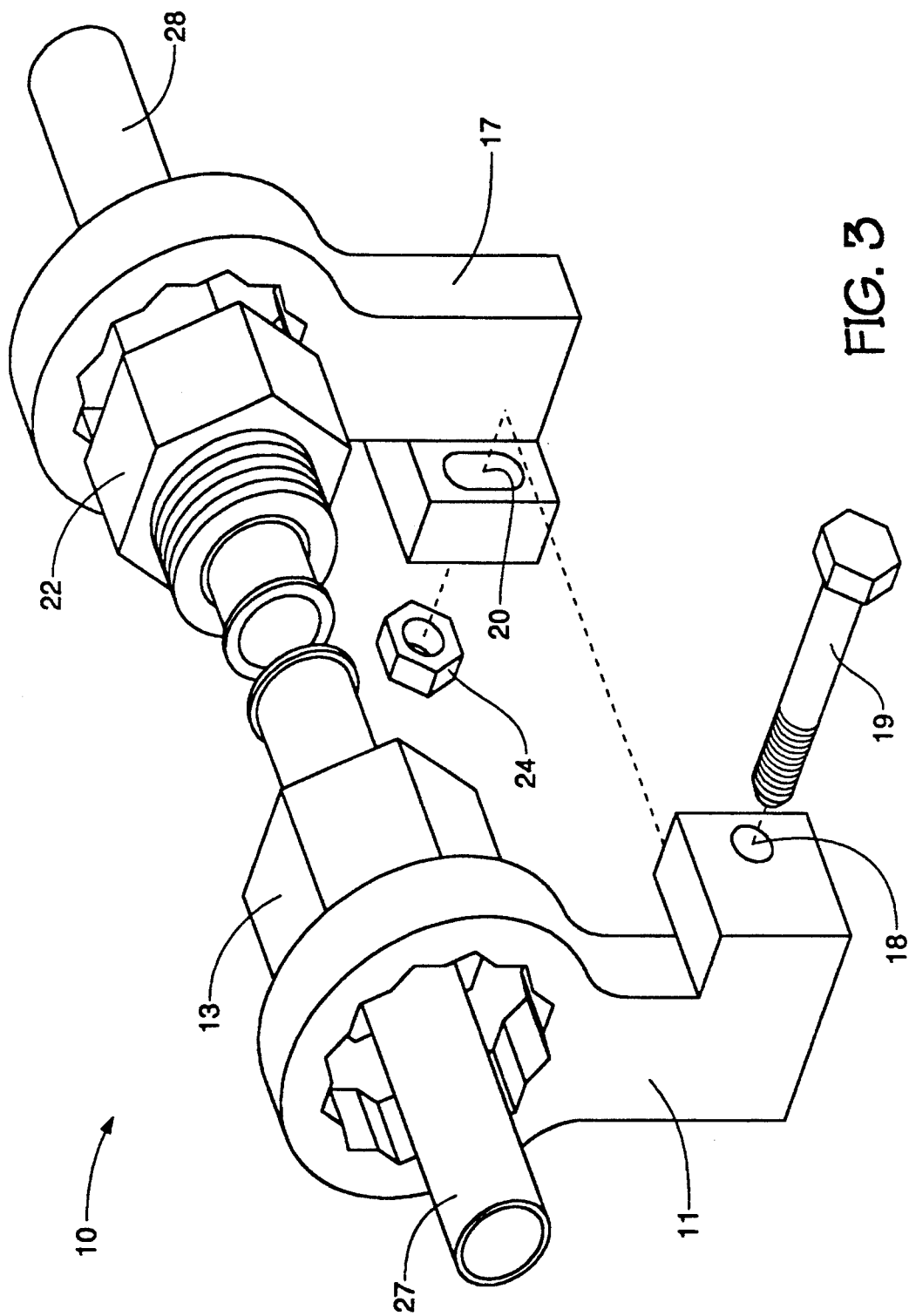
FIG. 3 is an isometric view of the first of two box wrench type nut locking means used in a second embodiment of this invention.

The first preferred embodiment is illustrated in FIG. 3 which shows two generally matching box end wrenches with shortened handles, which are the essential parts of this invention and designated by the numeral 10.

Each of the two box wrench means has flat, parallel front and rear opposing sides, with said front sides facing each other when assembled as shown in FIG. 3 and with smooth, rounded ends on the exterior surfaces of the wrenches which circumscribe the gripping surfaces of the wrenches. In the first embodiment the respective wrenches are configured in a typical, known, 12 point design, which closely circumscribes the typical hexagonal connecting nut and permits fine angular adjustment of the respective nuts after they are appropriately tightened to achieve a suitable seal, not shown, between the gas lines being joined and to align the two openings in the handles to permit a threaded bolt to be introduced therethrough and an appropriate threaded nut attached thereto to hold the two wrenches together.

Figure 1A:
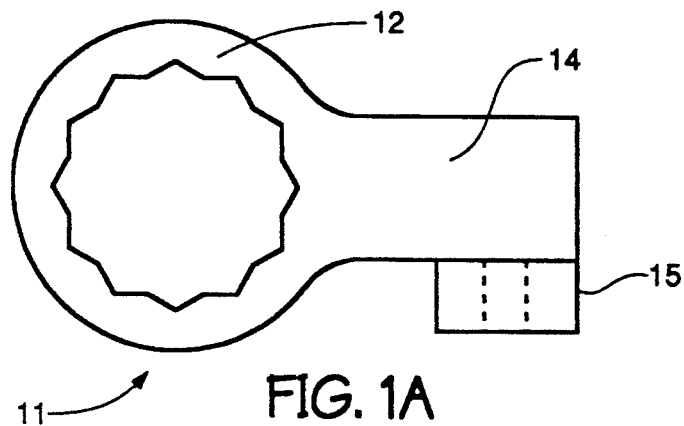
FIGS. 1A, 1B, 1C are front, side and top schematic views, respectively, of the first of two box wrench type nut locking means used in the first embodiment of this invention.
Figure 1C:
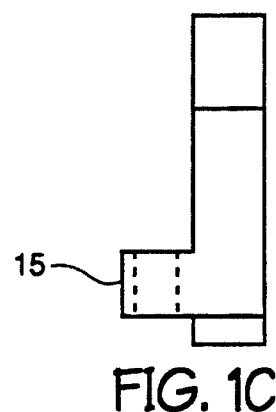
Figure 1B:
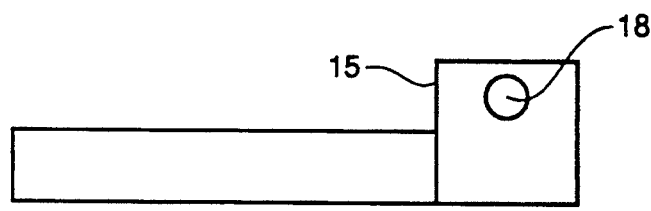
Figure 2A:
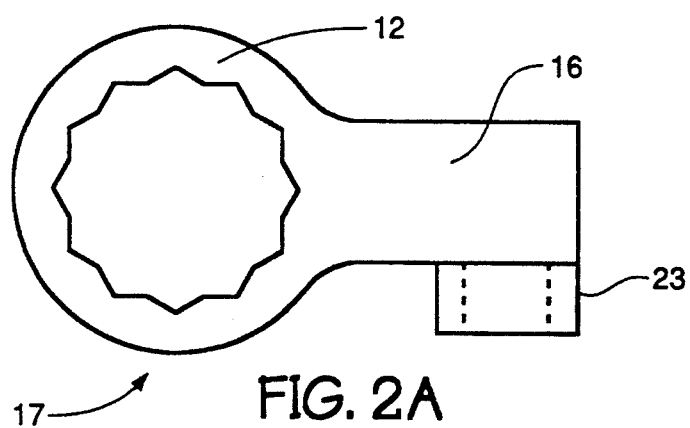
FIGS. 2A, 2B, 2C are front, side and top schematic views, respectively, of the second of two box wrench type nut locking means used in the first embodiment of this invention.
Figure 2C:
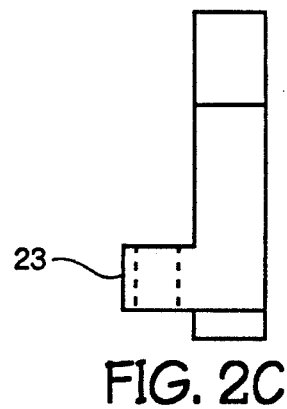
Figure 2B:
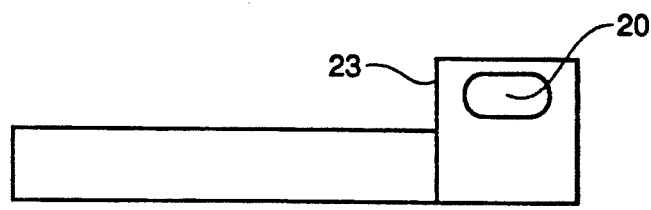

FIG. 1A shows a view of the front side of the first box wrench 11, having a typical 12 point holding and gripping means of known design 12, to closely circumscribe and hold a typical hexagonal connecting nut 13, as shown in FIG. 3 and having an integral, generally rectangular, short handle 14, with parallel opposing flat edges and sides extending laterally and in the same parallel planes as the opposing front and rear faces of the first box wrench. On the end of the short handle is an integral ear 15 extending from one edge of the handle and normal to and outwardly from the front face of the handle, toward the opposing handle 16 of the second box wrench 17 when the two wrenches are in the position shown in FIG. 3. Said ear 15 has an annular opening 18 extending inwardly through the center of the ear, in a plane parallel to and in front of the front face of the box wrench 11 and normal to the flat parallel edges of the handle. This opening 18 has a smooth bore and is designed to closely circumscribe and hold a suitable threaded bolt 19 which is selected to extend through said annular opening and pass through a generally matching opening 20, slotted parallel to the long axis of the handle, in a second ear 23 which is integral to the second box wrench 17, to be described and as shown in FIGS. 2A, 2B, 2C and 3.

Referring to FIGS. 2A, 2B, 2C and 3, the design and configuration of the second box wrench is virtually identical to the first box wrench. The internal diameter of the 12 point gripping surface may differ from that of the first box wrench to accommodate a possible different size connecting nut 22, one of the two nuts used to detachably join the two fluid lines 27, 28. Also, to accommodate some possible misalignment of the two openings in the ears of the two wrenches, the opening in the second ear is slotted to permit easier introduction of the bolt used to pull the two ears together after the connecting nuts have been torqued to close to their optimum value.

As shown in FIG. 3, the two wrenches are placed on the fluid lines behind their respective connecting nuts in such a way that the ears are on opposing edges of the first and second wrenches, as they face each other.

When the first 13 and second 22 hexagonal line connecting nuts have been tightened to approximately their optimum torque, using standard tightening means, such as hand tools, not shown, the locking nut wrenches of this invention are placed over the respective hexagonal nuts with the ears on each wrench angularly oriented in such a way that the annular opening 18 on the first ear 15 and the slotted opening 20 on the second ear 23 have a common central axis or as closely thereto as possible.

The body of the ear connecting bolt 19 is then inserted through the two ear openings and a suitable nut 24 is attached to the threaded end of the bolt. This nut is then tightened, drawing the two ears closer together, in generally parallel spaced relationship and without touching and creating the final torque adjustment to the two line connecting hexagonal nuts which hold the sealed gas lines being joined.

The second preferred embodiment illustrates locking wrenches 25, 26 having a 6 point holding and gripping design which is well-known and commercially available and which closely circumscribes the appropriate hexagonal line connecting nut over a wider, flat surface and is designed to be thinner in radial cross-section for application where space is limited or where torque requirements may be greater.

Figure 5:
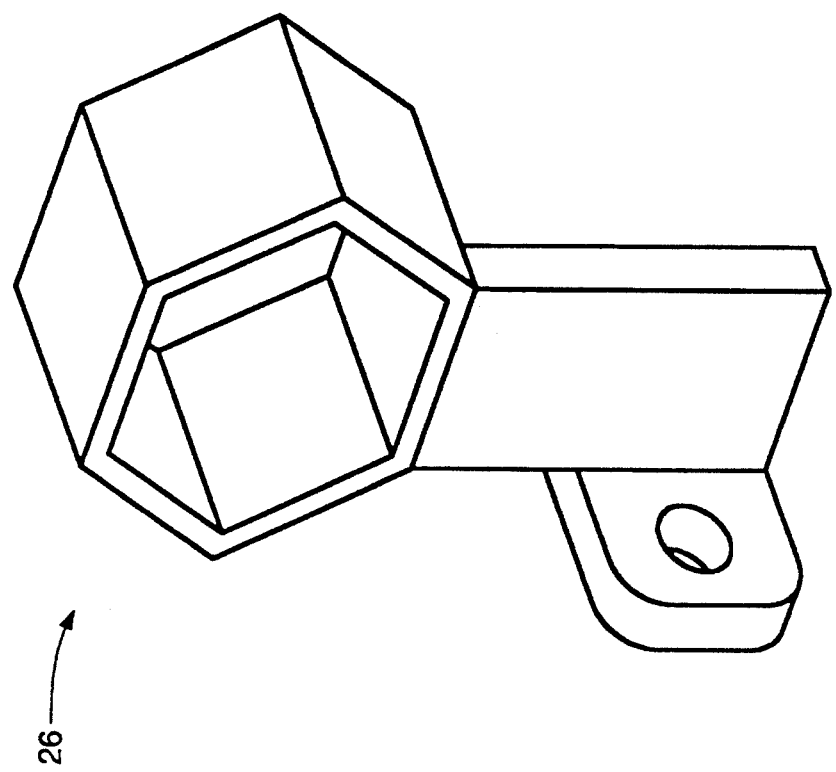
FIG. 4 and FIG. 5 are an isometric views of the second of two box wrench type nut locking means used in the second embodiment of this invention.
Figure 4:
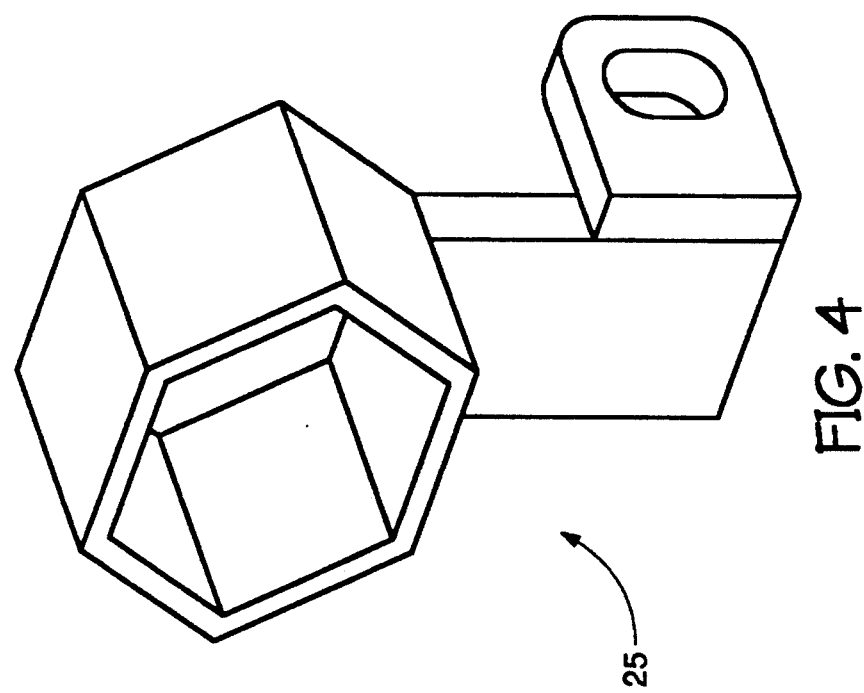

This design is shown in FIGS. 4 and 5. The general configuration of the two wrenches is basically the same, with the noted modification of the holding and gripping surfaces of the wrenches being changed from 12 point to six point design. Otherwise the two wrenches work in a similar manner to those described in the first embodiment, with an appropriate tightening bolt to pull the opposing ears on the two handles together.

This invention has been described in two preferred embodiments but many modifications and variations will be obvious to those skilled in the art. However the scope of the present invention is not limited by the above described details but only by the appended claims.

What is claimed is:

1. A detachable, nut locking device to hold and secure typical connecting nuts used on standard fluid transmission line end adapter means to join and seal together separate fluid transmission lines, said device comprising:

a. a pair of typical box end wrenches, each of standard design, each having a front and rear face and each configured to closely circumscribe, grip and hold an appropriate, typical connecting nut on a fluid transmission line end point adapter of known, commercial design;

b. said pair of box end wrenches, each having a shortened handle integral thereto, with an integral ear, having a front face and a rear parallel face, extending in an L-shape from the end of the handle, normal to and with said faces parallel to the long axis of the handle and outwardly from the front face of the box end wrench;

c. said ears on said wrench handles each having suitable and generally matching openings extending therethrough from said front face to said rear face, to permit removable introduction and passage of a suitable standard nut and bolt fastening means;

d. a suitable standard bolt type fastener, of known design, with at least one threaded end and a matching threaded nut removably attachable thereto, to be used to draw together and hold said ears on said pair of said box end wrenches;

e. said box end wrenches being each removably placed on the appropriate separate fluid transmission line end adapter means, behind the appropriately sized connecting nut attached thereto, and before the lines are joined, with the respective ears facing each other, said fluid transmission lines are then joined, with an appropriate seal, of known design, placed therebetween, said connecting nuts tightened to near their optimum torque, using conventional tightening means; and f. said pair of box end wrenches are then appropriately positioned on the connecting nuts and said standard bolt type fastener is inserted through the openings in the ears on the wrench handles, a nut attached thereto and tightened to hold and secure the connecting nuts and the seal from loosening and leaking during the operation and use of the fluid transmission lines.

* * * * *